United States Patent
Han et al.

(10) Patent No.: US 9,428,673 B2
(45) Date of Patent: Aug. 30, 2016

(54) ADHESIVE COMPOSITION AND USE THEREOF

(75) Inventors: Yi Han, Shanghai (CN); Xiaodong Zhao, Shanghai (CN); Bangfang He, Shanghai (CN); Yifang Shi, Shanghai (CN)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 86 days.

(21) Appl. No.: 14/005,625

(22) PCT Filed: Dec. 1, 2011

(86) PCT No.: PCT/CN2011/083313
§ 371 (c)(1),
(2), (4) Date: Sep. 18, 2013

(87) PCT Pub. No.: WO2012/126258
PCT Pub. Date: Sep. 27, 2012

(65) Prior Publication Data
US 2014/0000806 A1   Jan. 2, 2014

(30) Foreign Application Priority Data

Mar. 18, 2011   (CN) .......................... 2011 1 0069749

(51) Int. Cl.
| | | |
|---|---|---|
| *C08L 29/04* | (2006.01) | |
| *C09J 131/04* | (2006.01) | |
| *C08F 2/24* | (2006.01) | |
| *C08G 18/62* | (2006.01) | |
| *C08G 18/76* | (2006.01) | |
| *C09J 175/04* | (2006.01) | |
| *C09J 123/08* | (2006.01) | |
| *C09J 141/00* | (2006.01) | |
| *C09J 143/04* | (2006.01) | |
| *C08F 218/08* | (2006.01) | |

(52) U.S. Cl.
CPC ................ *C09J 131/04* (2013.01); *C08F 2/24* (2013.01); *C08G 18/6212* (2013.01); *C08G 18/6237* (2013.01); *C08G 18/7664* (2013.01); *C09J 123/0853* (2013.01); *C09J 141/00* (2013.01); *C09J 143/04* (2013.01); *C09J 175/04* (2013.01); *C08F 218/08* (2013.01)

(58) Field of Classification Search
CPC .............. C08F 2/24; C08F 2/26; C08F 2/30; C08F 210/02; C08F 218/08; C08G 18/6212; C08G 18/7664; C08G 18/6237; C09J 131/04; C09J 141/00; C09J 143/04; C09J 123/0853; C08K 5/29; C08L 29/04; C08L 23/0861
USPC ........................................ 524/459, 503, 507
See application file for complete search history.

(56) References Cited

U.S. PATENT DOCUMENTS

| | | | |
|---|---|---|---|
| 3,931,088 A * | 1/1976 | Sakurada et al. ............. 524/501 |
| 2012/0009379 A1 * | 1/2012 | Muller et al. .................. 428/96 |

FOREIGN PATENT DOCUMENTS

| | | | | |
|---|---|---|---|---|
| CA | 2751821 | * | 8/2010 | |
| CN | 101200518 | * | 6/2008 | ................ C08F 2/24 |
| CN | 101200518 A | | 6/2008 | |
| JP | 2000109629 | * | 4/2000 | .............. C08L 29/04 |
| JP | 2000109629 A | | 4/2000 | |
| JP | 2003082320 A2 | | 3/2003 | |
| JP | 2003171634 A | | 6/2003 | |

OTHER PUBLICATIONS

International Search Report issued in corresponding application PCT/CN2011/083313, Mailing Date Mar. 8, 2012.

* cited by examiner

*Primary Examiner* — Alexa Neckel
*Assistant Examiner* — Marie Reddick
(74) *Attorney, Agent, or Firm* — Roberts Mlotkowski Safran Cole & Calderon, P.C.

(57) ABSTRACT

The invention discloses an adhesive composition suitable for bonding wood, in particular hardwood. The adhesive composition comprises a vinyl acetate-ethylene copolymer-based emulsion, a vinyl alcohol polymer, and a polyisocyanate. The process for preparing the adhesive composition and use of the same are also disclosed.

13 Claims, No Drawings

ADHESIVE COMPOSITION AND USE THEREOF

BACKGROUND OF THE INVENTION

1. Field of the Invention

The present invention relates to an adhesive composition. More specifically, the present invention relates to an adhesive composition suitable for bonding wood, in particular hardwood. The present invention also relates to process for preparing the adhesive composition and use of the same.

2. Description of the Related Art

Vinyl acetate-ethylene (VAE) copolymer-based emulsions have been widely used in two-package adhesive compositions. In the conventional processes for preparing VAE copolymer-based emulsions, polyvinyl alcohols are typically used as protective colloid to maintain the stability of the emulsions. However, the emulsions obtained from those processes generally have relatively large particle size. As a consequence, the wood adhesive compositions obtained therefrom are only suitable for bonding wood having low density and hardness; whereas for wood having higher density and hardness, such as beech, birch, oak or the like, the bonding strength and water resistance are generally poor. For example, when used for bonding bench, the compression shear strength after boiling is typically only about 3.5 to 4.5 MPa, and the initial compression shear strength after applying is typically only about 4 MPa, measured according to JIS K6806, which cannot meet the requirements for high quality solid wood mosaic.

Japanese Patent Application Laid-Open No. 2003-171634 discloses an adhesive composition, comprising: (A) an ethylene-vinyl acetate copolymer emulsion, in which vinyl alcohol-based polymer having a saponification degree of 70 mol % or higher is used as dispersing agent, (B) a polyisocyanate compound, and (C) a vinyl alcohol-based polymer, wherein the amount of unreacted vinyl acetate monomer is 0.2 wt % or less and the concentration of formaldehyde is 1 ppm or less. According to that application, sufficient boiling water resistance may not be obtained when the level of the vinyl alcohol-based polymer, as dispersing agent, is lower than 2 parts by weight or higher than 15 parts by weight, per 100 parts by weight of the ethylene-vinyl acetate copolymer-based resin.

Japanese Patent Application Laid-Open No. 2003-082320 describes an aqueous adhesive composition, comprising: as base resin, a mixture of a resin emulsion and a polyvinyl alcohol, and as curing agent, a mixture of a high molecular weight compound and a low molecular weight compound both having at least two isocyanate groups. That application mentions, as examples of the resin emulsion, acrylic resin emulsion, vinyl acetate acrylate emulsion, ethylene-vinyl acetate resin emulsion, styrene-butadiene copolymer, methyl methacrylate-butadiene copolymer, styrene-butadiene-methyl methacrylate copolymers and polyisoprene. That application aims at the improvement of the curing agent, instead of the dispersing agent.

The compositions according to the above literatures are not suitable for bonding wood with higher density and hardness, as they are totally silent about the control of the particle size of the emulsions.

Thus, despite the foregoing efforts, a need still exists for an adhesive composition that have one or more of the following properties: suitable for bonding wood, in particular hardwood; having desirable high compression shear strength after boiling and initial compression shear strength after applying.

BRIEF SUMMARY OF THE INVENTION

As a result of an extensive study of the present inventors, it has been found that the conventional amounts of the polymeric protective colloid used during emulsion polymerization may have an adverse effect on the adhesion strength of the base resin. It has been surprisingly found that, by using a combination of a higher amount of surfactant and a lower amount of polymeric protective colloid, as compared to the conventional two-package adhesives, the adhesion strength is dramatically improved, in particular for bonding hardwood having higher density and hardness, without any loss of stability of the emulsion.

Thus, one object of the present invention is to provide an adhesive composition, suitable for bonding wood, in particular hardwood having higher density and hardness.

Another object of the present invention is to provide a process for preparing the said adhesive composition.

Still another object of the present invention is to provide a use of the adhesive composition.

DETAILED DESCRIPTION OF THE INVENTION

For the purposes of this description, unless otherwise indicated, all numbers expressing quantities of ingredients, reaction conditions, and so forth used in the description and claims are to be understood as being modified in all instances by the term "about". Accordingly, unless indicated to the contrary, the numerical parameters set forth in the following description and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific Examples are reported as precisely as possible. Any numerical value, however, inherently contain certain errors necessarily resulting from the standard deviation found in their respective testing measurements.

It is noted that, as used in this description and the appended claims, the singular forms "a", "an" and "the" include plural referents unless expressly and unequivocally limited to one referent.

According to one aspect of the present invention, an adhesive composition is provided, comprising:

(a) 1 to 50% by weight of a vinyl acetate-ethylene copolymer-based emulsion, wherein the copolymer comprises, based on the total weight of the copolymer:

(1) 70 to 95% by weight of a moiety derived from vinyl acetate;

(2) 5 to 30% by weight of a moiety derived from ethylene; and (3) 0 to 5% by weight of a moiety derived from other ethylenic unsaturated monomers, wherein the copolymer-based emulsion is formed by emulsion polymerization of the monomers in the presence of 0 to 3% by weight of an at least partially water-soluble polymeric protective colloid and 1 to 5% by weight of a surfactant, based on the total weight of the monomers, (b) 15 to 1% by weight of a vinyl alcohol polymer; and (c) 25 to 5% by weight of a polyisocyanate, wherein the weights of all of components (a), (b) and (c) are based on the total weight of the composition.

In some non-limiting embodiments of the present invention, the said surfactant can be selected from anionic surfactants or nonionic surfactants. Examples of anionic surfactants suitable for the present invention include, but not limited to, alkylsulfonates, arylsulfonates, alkylsulfates, sulfonated alkyl esters, alkali salts of fatty acids, or mixtures thereof. Examples of nonionic surfactants suitable for the present invention include, but not limited to, $C_{11}$ to $C_{14}$ alkyl polyoxyethylene ethers. As specific examples, surfactants commercially available under trade names Disponil A-3065 and Emulsogen 287, can be mentioned.

In some non-limiting embodiments of the present invention, the said polymeric protective colloid can be those at least partially water-soluble known in the art. The term "at least partially water-soluble" used herein can be interpreted as being capable of forming colloid phase or homogeneous phase in the water. Preferably, the at least partially water-soluble polymer can be selected from polyvinyl alcohol, cellulosic ethers, or mixtures thereof. Polyvinyl alcohols as polymeric protective colloid suitable for the present invention can have a saponification degree (degree of alcoholysis) of 75 to 95%, preferably 80 to 90%. Preferably, the polyvinyl alcohols may have a degree of polymerization of 200 to 4000. Cellulosic ethers as polymeric protective colloid suitable for the present invention include, but not limited to, ethyl cellulose ether and hydroxymethyl cellulose ether. As specific examples, cellulose ethers commercially available under trade name Natrosol 250 GR can be mentioned.

In some non-limiting embodiments of the present invention, the said vinyl alcohol polymer, as component (B), can have a saponification degree (degree of alcoholysis) of 75 to 99.5 mole %, preferably 87.5 to 92.5 mole %.

In some non-limiting embodiments of the present invention, the said polyisocyanate compound, as component (C), can be selected from poly-HDI (poly(hexamethylene diisocyanate)), poly-MDI (diphenylmethane-4,4'-diisocyanate), PAPI, or mixtures thereof.

In some non-limiting embodiments of the present invention, the said other ethylenic unsaturated monomers can be selected from vinyl sulfonates, vinyl silanes, hydroxyalkyl (meth)acrylates, hydroxyalkyl acrylamide, glycidyl (meth) acrylate, or mixtures thereof. Preferably, vinyl sulfonates can be sodium vinyl sulfonate, sodium vinyl phenyl sulfonate or the like. Vinyl silanes can be vinyl trimethoxysilane, vinyltriethoxysilane, vinyl triisopropoxysilane, 3-(methylacryloxy)propyltrimethoxysilane or the like. Hydroxyalkyl (meth)-acrylates can be hydroxyethyl acrylate, hydroxyethyl methacrylate, hydroxypropyl acrylate, hydroxypropyl acrylate or the like. Hydroxyalkyl acrylamide can be N-hydroxymethyl acrylamide, N-hydroxyethyl acrylamide or the like. The copolymer-based emulsion according to the present invention may have a solid content of 40 to 70% by weight, preferably 50 to 60% by weight, based on the total weight of the emulsion. The copolymer-based emulsion according to the present invention may have a very small particle size, for example, a particle size ($d_{90}$) of less than 0.5 micrometers, preferably less than 0.3 micrometers.

In some non-limiting embodiments of the present invention, the adhesive composition may contain other conventional additives, for example, such as fillers, wetting dispersing agents, preservatives, defoamers, plasticizers, and the like.

Examples of fillers suitable for the present invention may include, but not limited to clay, starch, calcium carbonate, or mixtures thereof. Preferably, fillers such as calcium carbonate can be added in an amount of 0 to 40% preferably 20 to 30%, based on the total weight of the composition.

Examples of wetting dispersing agents suitable for the present invention may include, but not limited to, sodium, potassium and ammonium salts-based dispersing agents containing acrylic group(s), or mixtures thereof. As specific examples, wetting dispersing agents commercially available under trade name Hydropalat 5040, SN5027, SN5029, SN5468, Hypropalat3204, Hydropalat3275, can be mentioned. Preferably, wetting dispersing agents such as Hydropalat5040 can be added in an amount of 0 to 1%, preferably 0.2 to 0.3%, based on the total weight of the composition.

Examples of preservatives suitable for the present invention may include, but not limited to MIT, BIT, OMIT, bronopol, or mixtures thereof. As specific examples, preservatives commercially available under trade name Rocima 562, ATICIDE MBS, ATICIDE RS, Kathlon LXE, Rocima 523 can be mentioned. Preferably, preservatives such as ATICIDE RS can be added in an amount of 0 to 1%, preferably 0.1 to 0.2%, based on the total weight of the composition.

Examples of defoamers suitable for the present invention may include, but not limited to mineral oil, silicon based oil, or mixtures thereof. As specific examples, defoamers commercially available under trade name Foamaster 111, Foamaster NXZ, SN470, SN1370, SN1390, can be mentioned. Preferably, defoamers such as Foamaster NXZ can be added in an amount of 0 to 1%, preferably 0.1 to 0.3%, based on the total weight of the composition.

In some non-limiting embodiments of the present invention, besides the water contained in the copolymer-based emulsion, additional water may be added to the adhesive composition. The said additional water may be added in an amount of 0 to 30%, preferably 8 to 15%.

Preferably, the adhesive composition according to the present invention can be formed in a two-package adhesive product. For example, the first package (base resin) may contain the vinyl acetate-ethylene copolymer-based emulsion (A) and the vinyl alcohol polymer (B), and optionally wetting dispersing agent, filler, additional water and/or preservative; the second package (curing agent) may contain the polyisocyanate compound (C).

When used for bonding hardwood (e.g. bench) sheets, the obtained sheets may have high initial adhesion strength and excellent boiling water resistance. In a preferable embodiment of the present invention, the bonded bench sheets may have a initial compression shear strength of as high as 5.7 MPa after applying, and a compression shear strength of as high as 7 MPa after boiling, measured according to JIS K6806. Those properties are sufficient for the manufacturing of high quality solid wood mosaic.

According to another aspect of the present invention, a process for preparing the adhesive composition is provided, comprising:

(a) forming a vinyl acetate-ethylene copolymer-based emulsion by emulsion polymerization of a monomeric composition comprising:

(1) 70 to 95% by weight of vinyl acetate;

(2) 5 to 30% by weight of ethylene; and (3) 0 to 5% by weight of other ethylenic unsaturated monomers, in the presence of 0 to 3% by weight of an at least partially water-soluble polymeric protective colloid and 1 to 5% by weight of a surfactant, based on the total weight of the monomers, and (b) mixing the copolymer-based emulsion with a vinyl alcohol polymer and a polyisocyanate.

In some non-limiting embodiments of the present invention, the emulsion polymerization is conducted in the presence of a redox initiator. Preferably, the redox initiator suitable for the present invention may include, but not limited to, ammonium persulfate, sodium persulfate, potassium persulfate, hydrogen peroxide, tert-butyl peroxide, sodium formaldehyde-sulfoxylate, disodium 2-hydroxy-2-sulfinatoacete, ascorbic acid, erythorbic acid, sodium bisulfite, sodium sulfite, sodium metabisulfite, or mixtures thereof. In general, the oxidizing agent and reducing agent may be used in an amount of 0.05 to 0.5 parts by weight, preferably 0.08 to 0.3, per 100 parts by weight of the total monomers.

The vinyl acetate-ethylene copolymer-based emulsion can be obtained by processes known in the field of emulsion polymerization. In a preferable embodiment of the present invention, the emulsion may be obtained by the following steps: forming an aqueous phase by adding surfactant and protective colloid, as dispersing agent, and other conventional additives into water; feeding the aqueous phase to a reactor under slow stirring; evacuating the reactor under vacuum and purging with nitrogen at least twice for removing any air; raising the temperature of the reactor and the speed of stirring, adding to the reactor part of the vinyl acetate monomer or mixture of the vinyl acetate monomer and the other ethylenic unsaturated monomers, together with part of ethylene gas; after the pressure of the reactor becomes constant (typically 10 to 55 bars, preferably 15 to 40 bars), adding oxidizing agent and reducing agent as redox initiator, so that polymerization takes place, with increasing of temperature; adding remaining monomers when the temperature of the reactor reaches a predetermined value until the consumption of the monomers. In some non-limiting embodiments of the present invention, the temperature of the reactor is controlled within a range from 50 to 90° C., preferably from 60 to 85° C. In some non-limiting embodiments of the present invention, the reactor is cooled after completion of polymerization. The product can be then subjected to a post-treatment by removing therefrom unreacted ethylene gas and adding thereto additional redox initiator to reduce the amount of unreacted monomers. The copolymer-based emulsion thus obtained can be combined with additional water and/or other conventional additives. The emulsion generally can have a solid content of 40 to 70%, preferably 50 to 60%, and a particle size ($d_{90}$) of 0.5 micrometers or less, preferably less than 0.3 micrometers.

In a preferable embodiment of the present invention, the conventional additives added to the aqueous phase include those known in the art to improve stability or pot life of the final emulsion. For example, those additives can be redox reaction promoter, pH adjusting agents, defoamers, fungicides, chelating agents, and the like.

In the present invention, the adhesive composition can be a two package adhesive product, which can be combined immediately before use. In a preferable embodiment of the present invention, the first package (base resin) can be obtained by the following steps: adding to the copolymer-based emulsion (A) part of the vinyl alcohol polymer (B) solution and the optional wetting dispersing agent; adding the optional fillers under stirring; and adding in order the remaining vinyl alcohol polymer (B) solution, the optional additional water and optional preservatives.

According to yet another aspect of the present invention, use of the adhesive composition for bonding wood is provided.

The adhesive composition according to the present invention is particularly suitable for bonding hardwood having higher density and hardness. For example, the air-dry density of the wood can be higher than 0.55 g/cm$^3$, preferably than 0.6 g/cm$^3$. As specific examples of the hardwood, beech, birch and oak, can be mentioned.

The adhesive composition according to the present invention can be applied by any conventional methods known in the art. For example, the adhesive composition can be applied to substrates by machine roll coating, manual roll coating or manual brush coating.

The following Examples are included to demonstrate preferred embodiments of the invention. It should be appreciated by those of skill in the art that the techniques disclosed in the Examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Unless indicated to the contrary, all parts and percentages are by weight.

Test

Compression shear strength after boiling (boiling resistance) was measured according to JIS K6806.

Sample preparation: adding MDI hardener to the base resin package in a predetermined amount, thereby yielding a homogeneous adhesive composition; applying the adhesive composition to surfaces of beech sheets having a dimension of 10×25×30 mm$^3$ inside a constant temperature and humidity chamber, with a controlled coat weight of 125 g/m$^2$; laminating the sheets under a pressure of 15 kgf for 120 mins; and then placing the laminated sheets under a constant temperature and humidity condition for 7 days prior to testing.

Testing: immersing the samples in boiling water (100° C.) for 4 hours; placing the samples in an oven at 60° C. and drying for 20 hours; immersing the dried samples in boiling water (100° C.) for another 4 hours; immersing the samples in cold water and testing the compression shear strength within 10 mins.

Initial compression shear strength was measured according to the following procedure: coating beech sheets with the same procedure as described above; laminating the coated sheets under a pressure of 7 kgf for 40 mins; and then immediately testing the compression shear strength.

Example 1

An emulsion was prepared using the following formulation.

Charge I (Aqueous Phase)

| | |
|---|---|
| deionized water | 3380.0 g |
| Disponil A3065 (Cognis, alkyl polyoxyethylene ether, a.i. 65%) | 238.5 g |

-continued

| Celvol 504 (Sekisui, PVOH, alcohoysis degree: 88%, a.i. 29%) | 222.7 g |
| Rhodacal DS4 (sodium alkyl phenylsulfonate, a.i. 24%) | 280.3 g |
| sodium vinylsulfonate (a.i. 30%) | 89.7 g |
| disodium 2-hydroxy-2-sulfinatoacetate | 1.1 g |

Charge II (Monomers)

| vinyl acetate | 4814.3 g |
| Silan A171 (vinyl silane) | 40.4 g |
| ethylene | 567.8 g |

Charge III (Redox Initiator)

| oxidizing agent solution: | |
| sodium persulfate | 7.5 g |
| water | 198.6 g |
| reducing agent solution: | |
| disodium 2-hydroxy-2-sulfinatoacetate | 4.3 g |
| water | 220.7 g |

Charge IV (Post-Treatment Agents)

| water | 149.6 g |
| t-butyl peroxide (70%) | 3.1 g |
| sodium metabisulfite | 1.1 g |

To a 10 L reactor was added the aqueous phase under stirring (300 rpm). The reactor was evacuated and purged with nitrogen for three times to remove residual air. The stirring speed was then increased to 600 rpm. 242 g of a mixture of vinyl acetate and vinyl silane (Silan A171) and 22 g reducing agent solution were added within 10 mins. The pressure of the reactor was raised to 40 bars by feeding ethylene gas. The reactor was heated to 55° C. and equilibrated for 5 mins. Oxidizing agent solution and the remaining reducing agent solution were added within 270 mins. The temperature of the reactor was adjusted to 70° C. within 15 mins. When the temperature of the reactor reached 57° C., the remaining mixture of vinyl acetate and vinyl silane (Silan A171) was added within 200 mins. When the temperature of the reactor reached 70° C., the remaining ethylene gas was fed to maintain the maximum pressure of the reactor below 55 bars. After completion of adding the mixture of vinyl acetate and vinyl silane (Silan A171), the temperature of the reactor was adjusted to 85° C. within 15 mins and maintained for 10 to 30 mins. The reactor was then cooled to 60° C. The obtained emulsion was transferred to post-treatment reactor.

The post-treatment reactor was stirred at a speed of 200 rpm. The solution of sodium metabisulfite was added within 15 mins. Then, the solution of t-butyl peroxide was added within 10 mins. The post-treatment reactor was cooled to 40° C.

The obtained emulsion (Emulsion 1) has the following properties:

| ratio of vinyl acetate/ethylene/sodium vinyl sulfonate/vinyl silane | 89.5/10.5/0.5/0.75 |
| PVOH protective colloid | 1.2% wt |
| surfactants | 4.1% wt |
| solid content | 53.2% |
| pH | 5.2 |
| Viscosity (BVF, 20 rpm) | 288 mPa · s |
| particle size ($d_{90}$) | 177 nm |

Example 2

An emulsion was prepared using the following formulation.

Charge I (Aqueous Phase)

| deionized water | 3380.0 g |
| Disponil A 3065 (Cognis, alkyl polyoxyethylene ether, a.i. 65%) | 238.5 g |
| Celvol 504 (Sekisui, PVOH, alcohoysis degree: 88%, a.i. 29%) | 445.4 g |
| sodium dodecyl phenylsulfonate (a.i. 24%) | 112.1 g |
| sodium vinylsulfonate (a.i. 30%) | 89.7 g |
| disodium 2-hydroxy-2-sulfinatoacetate | 1.1 g |

Charge II (Monomers)

| vinyl acetate | 4814.3 g |
| ethylene | 567.8 g |

Charge III (Redox Initiator)

| oxidizing agent solution: | |
| sodium persulfate | 7.5 g |
| water | 198.6 g |
| reducing agent solution: | |
| disodium 2-hydroxy-2-sulfinatoactate | 4.3 g |
| water | 220.7 g |

Charge IV (Post-Treatment Agents)

| water | 149.6 g |
| t-butyl peroxide (70%) | 3.1 g |
| Sodium metabisulfite | 1.1 g |

To a 10 L reactor was added the aqueous phase under stirring (300 rpm). The reactor was evacuated and purged with nitrogen for three times to remove residual air. The stirring speed was then increased to 600 rpm. A mixture of 242 g vinyl acetate and 22 g reducing agent solution were added within 10 mins. The pressure of the reactor was raised to 40 bars by feeding ethylene gas. In the meantime, the reactor was heated to 55° C. and equilibrated for 5 mins. Oxidizing agent solution and the remaining reducing agent solution were added within 270 mins. The temperature of the reactor was adjusted to 70° C. within 15 mins. When the temperature of the reactor reached 57° C., the remaining vinyl acetate was added within 200 mins. When the temperature of the reactor reached 70° C., the remaining ethylene gas was fed to maintain the maximum pressure of the reactor below 55 bars. After completion of adding vinyl acetate, the temperature of the reactor was adjusted to 85° C. within 15 mins and maintained for 10 to 30 mins. The reactor was then cooled to 60° C. The obtained emulsion was transferred to post-treatment reactor.

The temperature of the reactor was increased. When the temperature of the reactor reached 52° C., the remaining mixture of vinyl acetate, vinyl silane (Agitan 282) and glycidyl acrylate was added at a constant speed. The reactor was maintained for 240 mins. The temperature of the reactor was adjusted to 65° C. within 15 mins When the temperature of the reactor reached 60° C., the remaining ethylene gas was fed within 150 mins and maintained the maximum pressure of the reactor below 55 bar. After completion of adding the redox solution, the reactor was then cooled to 55° C. The obtained emulsion was transferred to post-treatment reactor.

The post-treatment reactor was stirred at a speed of 200 rpm. The solution of sodium metabisulfite was added within 15 mins. Then, the solution of t-butyl peroxide was added within 10 mins. The post-treatment reactor was cooled to 40° C.

The obtained emulsion (Emulsion 2) has the following properties:

| | |
|---|---|
| ratio of vinyl acetate/ethylene/sodium vinyl sulfonate | 89.5/10.5/0.5 |
| PVOH protective colloid | 2.4% wt |
| surfactants | 3.4% wt |
| solid content | 53.7% |
| pH | 5.3 |
| Viscosity (BVF, 20 rpm) | 950 mPa · s |
| particle size ($d_{90}$) | 204 nm |

Example 3

An emulsion was prepared using the following formulation.

Charge I (Aqueous Phase)

| | |
|---|---|
| deionized water | 3380.0 g |
| Disponil A3065 (Cognis, alkyl polyoxyethylene ether, a.i. 65%) | 238.5 g |
| Rhodacal DS4 (sodium alkyl phenylsulfonate, a.i. 24%) | 448.4 g |
| sodium vinylsulfonate (a.i. 30%) | 89.7 g |
| disodium 2-hydroxy-2-sulfinatoacetate | 1.1 g |

Charge II (Monomers)

| | |
|---|---|
| vinyl acetate | 4814.3 g |
| Silan A171 (vinyl silane) | 80.8 g |
| ethylene | 567.8 g |

Charge III (Redox Initiator)

| | |
|---|---|
| oxidizing agent solution: | |
| sodium persulfate | 7.5 g |
| water | 198.6 g |
| reducing agent solution: | |
| disodium 2-hydroxy-2-sulfinatoacetate | 4.3 g |
| water | 220.7 g |

Charge IV (Post-Treatment Agents)

| | |
|---|---|
| water | 149.6 g |
| t-butyl peroxide (70%) | 3.1 g |
| sodium metabisulfite | 1.1 g |

To a 10 L reactor was added the aqueous phase under stirring (300 rpm). The reactor was evacuated and purged with nitrogen for three times to remove residual air. The stirring speed was then increased to 600 rpm. 242 g of a mixture of vinyl acetate and vinyl silane (Silan A171) and 22 g reducing agent solution were added within 10 mins. The pressure of the reactor was raised to 40 bars by feeding ethylene gas. The reactor was heated to 55° C. and equilibrated for 5 mins. Oxidizing agent solution and the remaining reducing agent solution were added within 270 mins. The temperature of the reactor was adjusted to 70° C. within 15 mins. When the temperature of the reactor reached 57° C., the remaining mixture of vinyl acetate and vinyl silane (Silan A171) was added within 200 mins. When the temperature of the reactor reached 70° C., the remaining ethylene gas was fed to maintain the maximum pressure of the reactor below 55 bars. After completion of adding the mixture of vinyl acetate and vinyl silane (Silan A171), the temperature of the reactor was adjusted to 85° C. within 15 mins and maintained for 10 to 30 mins. The reactor was then cooled to 60° C. The obtained emulsion was transferred to post-treatment reactor.

The post-treatment reactor was stirred at a speed of 200 rpm. The solution of sodium metabisulfite was added within 15 mins. Then, the solution of t-butyl peroxide was added within 10 mins. The post-treatment reactor was cooled to 40° C.

The obtained emulsion (Emulsion 3) has the following properties:

| | |
|---|---|
| ratio of vinyl acetate/ethylene/sodium vinyl sulfonate/vinyl silane | 89.5/10.5/0.5/1.5 |
| PVOH protective colloid | 0 |
| surfactants | 4.9% wt |
| solid content | 52.7% |
| pH | 5.1 |

| | |
|---|---|
| Viscosity (BVF, 20 rpm) | 86 mPa · s |
| particle size (d$_{90}$) | 201 nm |

Example 4

An emulsion was prepared using the following formulation.

Charge I (Aqueous Phase)

| | |
|---|---|
| deionized water | 3380.0 g |
| Disponil A3065 (Cognis, alkyl polyoxyethylene ether, a.i. 65%) | 238.5 g |
| Celvol 504 (Sekisui, PVOH, alcohoysis degree: 88%, a.i. 29%) | 37.1 g |
| Rhodacal DS4 (sodium alkyl phenylsulfonate, a.i. 24%) | 118.9 g |
| sodium vinylsulfonate (a.i. 30%) | 89.7 g |
| disodium 2-hydroxy-2-sulfinatoacetate | 1.1 g |

Charge II (Monomers)

| | |
|---|---|
| vinyl acetate | 4526.3 g |
| Silan A171 (vinyl silane) | 22.7 g |
| ethylene | 855.7 g |

Charge III (Redox Initiator)

| | |
|---|---|
| oxidizing agent solution: | |
| sodium persulfate | 7.5 g |
| water | 198.6 g |
| reducing agent solution: | |
| disodium 2-hydroxy-2-sulfinatoacetate | 4.3 g |
| water | 220.7 g |

Charge IV (Post-Treatment Agents)

| | |
|---|---|
| water | 149.6 g |
| t-butyl peroxide (70%) | 3.1 g |
| sodium metabisulfite | 1.1 g |

To a 10 L reactor was added the aqueous phase under stirring (300 rpm). The reactor was evacuated and purged with nitrogen for three times to remove residual air. The stirring speed was then increased to 600 rpm. 227.5 g of a mixture of vinyl acetate and vinyl silane (Silan A171) and 22 g reducing agent solution were added within 10 mins. The pressure of the reactor was raised to 40 bars by feeding ethylene gas. The reactor was heated to 55° C. and equilibrated for 5 mins. Oxidizing agent solution and the remaining reducing agent solution were added within 270 mins. The temperature of the reactor was adjusted to 70° C. within 15 mins. When the temperature of the reactor reached 57° C., the remaining mixture of vinyl acetate and vinyl silane (Silan A171) was added within 200 mins. When the temperature of the reactor reached 70° C., the remaining ethylene gas was fed to maintain the maximum pressure of the reactor below 55 bars. After completion of adding the mixture of vinyl acetate and vinyl silane (Silan A171), the temperature of the reactor was adjusted to 85° C. within 15 mins and maintained for 10 to 30 mins. The reactor was then cooled to 60° C. The obtained emulsion was transferred to post-treatment reactor.

The post-treatment reactor was stirred at a speed of 200 rpm. The solution of sodium metabisulfite was added within 15 mins. Then, the solution of t-butyl peroxide was added within 10 mins. The post-treatment reactor was cooled to 40° C.

The obtained emulsion (Emulsion 4) has the following properties:

| | |
|---|---|
| ratio of vinyl acetate/ethylene/sodium vinyl sulfonate/vinyl silane | 84.1/15.9/0.5/0.4 |
| PVOH protective colloid | 0.2% wt |
| surfactants | 3.4% wt |
| solid content | 56.2% |
| pH | 4.6 |
| Viscosity (BVF, 20 rpm) | 228 mPa · s |
| particle size (d$_{90}$) | 214 nm |

Examples 5 to 11

Adhesive component A was prepared by adding PVOH aqueous solution, defoamer, dispersing agent and filler (calcium carbonate), in an amount as described in the following Table I, into the Emulsions 1 to 4, respectively. PMDI that is commercial available under the tradename of Bayer Desmodur 44V20L was used as adhesive component B. Adhesive component B, in an amount of 15% per adhesive component A, was mixed with adhesive component A.

Comparative Example 1

Adhesive component A was prepared by adding PVOH aqueous solution, defoamer, dispersing agent and filler (calcium carbonate), in an amount as described in the following Table I, into a conventional VAE emulsion prepared by using 4.5 wt % of PVOH protective colloid and 0.4 wt % of surfactant, based on the total weight of monomers. PMDI that is commercial available under the tradename of Bayer Desmodur 44V20L was used as adhesive component B. Adhesive component B, in an amount of 15% per adhesive component A, was mixed with adhesive component A.

Adhesion strength and boiling water resistance were measured according to JIS K6806. Initial compression shear strength was measured according the above paragraph [0041]. Beech having a water content of 8 to 10% was used. The results were shown in the Table I below.

TABLE I

| | Example 5 | Example 6 | Example 7 | Example 8 | Example 9 | Example 10 | Example 11 | Comparative Example 1 |
|---|---|---|---|---|---|---|---|---|
| Emulsion type | Emulsion 1 | Emulsion 2 | Emulsion 3 | Emulsion 4 | Emulsion 3 | Emulsion 3 | Emulsion 3 | conventional |
| amount | 29.5% | 29.5% | 29.5% | 29.5% | 37.6% | 39.5% | 37.6% | 37.6% |
| PVOH (20% aqueous solution) | Celvol540 28% | Celvol540 28% | Celvol540 28% | Celvol540 28% | Celvol540 28% | Celvol540 20% | Celvol523 28% | Celvol540 28% |
| 5040(Congins) | 0.3% | 0.3% | 0.3% | 0.3% | 0.2% | 0.3% | 0.2% | 0.2% |
| Foamaster NXZ (Congins) | 0.2% | 0.2% | 0.2% | 0.2% | 0.2% | 0.2% | 0.2% | 0.2% |
| $CaCO_3$(800mesh) | 28% | 28% | 28% | 28% | 22% | 28% | 22% | 22% |
| water | 14% | 14% | 14% | 14% | 12% | 12% | 12% | 12% |
| Desmodur 44V20L (Bayer) | 15% | 15% | 15% | 15% | 15% | 15% | 15% | 15% |
| Boiling water resistance (JIS6806) | 7.9 MPa | 7.6 MPa | 7.7 MPa | 7.0 MPa | 7.8 Mpa | 8.1 MPa | 6.8 MPa | 4.1 MPa |
| Initial compression shear strength | 6.1 MPa | 5.5 MPa | 6.0 MPa | 5.3 MPa | 5.9 Mpa | 6.1 MPa | 5.6 MPa | 3.8 MPa |

All of the methods disclosed and claimed herein can be made and executed without undue experimentation in light of the present disclosure. While the products and methods of this invention have been described in terms of preferred embodiments, it will be apparent to those of skill in the art that variations may be applied to the methods and in the steps or in the sequence of steps of the method described herein without departing from the concept, spirit and scope of the invention.

What is claimed is:

1. An adhesive composition for bonding wood, comprising:
   (a) 1 to 50% by weight of a vinyl acetate-ethylene copolymer-based emulsion, wherein the copolymer comprises, based on the total weight of the copolymer:
   (1) 70 to 95% by weight of a moiety derived from vinyl acetate monomer;
   (2) 5 to 30% by weight of a moiety derived from ethylene monomer; and
   (3) 0 to 5% by weight of a moiety derived from other ethylenically unsaturated monomers,
   wherein the copolymer-based emulsion is formed by emulsion polymerization of the monomers in the presence of 0 to 3% by weight of an at least partially water-soluble polymeric protective colloid and 1 to 5% by weight of a surfactant, both based on the total weight of the monomers, wherein a combination of a higher amount of surfactant and a lower amount of polymeric protective colloid is used; and
   (b) 15 to 1% by weight of a vinyl alcohol polymer which has a degree of alcoholysis of at least 87.5 mole %;
   (c) 25 to 5% by weight of a polyisocyanate; and
   (d) up to 40% by weight of one or more fillers, wherein the weight % of components (a)-(d) are all based on the total weight of the composition.

2. The composition according to claim 1, wherein the surfactant is anionic or nonionic.

3. The composition according to claim 2, wherein the anionic surfactants are selected from the group consisting of alkylsulfonates, arylsulfonates, alkylsulfates, sulfonated alkyl esters, alkali salts of fatty acids, and mixtures thereof.

4. The composition according to claim 2, wherein the nonionic surfactants are $C_{11}$ to $C_{14}$ alkyl polyoxyethylene ethers.

5. The composition according to claim 1, wherein the polymeric protective colloid is a polyvinyl alcohol, a cellulosic ether, or mixtures thereof.

6. The composition according to claim 5, wherein the polyvinyl alcohol has a degree of alcoholysis of 75 to 95 mole %.

7. The composition according to claim 5, wherein the polyvinyl alcohol has a degree of alcoholysis of 80 to 90 mole %.

8. The composition according to claim 1, wherein the vinyl alcohol polymer has a degree of alcoholysis of 87.5 to 99.5 mole %.

9. The composition according to claim 1, wherein the polyisocyanate is poly(hexamethylene diisocyanate), polydiphenylmethane-4,4'-diisocyanate, or mixtures thereof.

10. The composition according to claim 1, wherein the other ethylenically unsaturated monomers are selected from the group consisting of vinyl sulfonates, vinyl silanes, hydroxyalkyl (meth)acrylates, hydroxyalkyl acrylamide, glycidyl (meth)acrylate, and mixtures thereof.

11. The composition according to claim 1, wherein the copolymer-based emulsion has a solid content of 40 to 70% by weight based on the total weight of the emulsion.

12. The composition according to claim 1, wherein the copolymer-based emulsion has an average particle size ($d_{90}$) of less than 0.5 micrometers.

13. The composition according to claim 1, wherein the copolymer-based emulsion has a solid content of 50 to 60% by weight based on the total weight of the emulsion.

* * * * *